(12) United States Patent
Pieczul et al.

(10) Patent No.: US 9,699,168 B2
(45) Date of Patent: Jul. 4, 2017

(54) METHOD AND SYSTEM FOR AUTHENTICATING A RICH CLIENT TO A WEB OR CLOUD APPLICATION

(75) Inventors: Olgierd Stanislaw Pieczul, Dublin (IE); Mark Alexander McGloin, Dublin (IE); Mary Ellen Zurko, Groton, MA (US); David Scott Kern, Billerica, MA (US); Brent Allan Hepburn, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 628 days.

(21) Appl. No.: 12/966,165

(22) Filed: Dec. 13, 2010

(65) Prior Publication Data

US 2012/0151568 A1 Jun. 14, 2012

(51) Int. Cl.
| | |
|---|---|
| *H04L 29/06* | (2006.01) |
| *H04L 29/08* | (2006.01) |
| *G06F 21/31* | (2013.01) |
| *G06F 21/62* | (2013.01) |
| *H04L 9/32* | (2006.01) |

(52) U.S. Cl.
CPC .......... *H04L 63/0815* (2013.01); *H04L 67/02* (2013.01); *H04L 63/0884* (2013.01)

(58) Field of Classification Search
CPC ......... H04L 63/10; H04L 9/32; H04L 9/3213; G06F 21/31; G06F 21/62; G06F 11/1464; G06F 17/30; G06F 21/6263; G06F 2221/0711; G06F 2221/2115
USPC ................................ 726/1–31; 713/152–181
See application file for complete search history.

(56) References Cited

U.S. PATENT DOCUMENTS

| | | | |
|---|---|---|---|
| 7,475,075 B2 | 1/2009 | Lindhorst et al. | |
| 7,631,346 B2 * | 12/2009 | Hinton | G06F 21/41 |
| | | | 380/279 |
| 8,225,385 B2 * | 7/2012 | Chow | H04L 63/08 |
| | | | 713/168 |
| 2005/0039009 A1 | 2/2005 | Zhou et al. | |
| 2006/0195588 A1 | 8/2006 | Pennington et al. | |
| 2006/0212514 A1 | 9/2006 | Saillet | |
| 2009/0112879 A1 | 4/2009 | Oliveira et al. | |

* cited by examiner

*Primary Examiner* — Tae Kim
*Assistant Examiner* — Shiuh-Huei Ku
(74) *Attorney, Agent, or Firm* — David B. Woycechowsky; David H. Judson; Jeffrey S. LaBaw

(57) ABSTRACT

A rich client performs single sign-on (SSO) to access a web- or cloud-based application. According to the described SSO approach, the rich client delegates to its native application server the task of obtaining a credential, such as a SAML assertion. The native server, acting on behalf of the user, obtains an assertion from a federated identity provider (IdP) that is then returned to the rich client. The rich client provides the assertion to a cloud-based proxy, which presents the assertion to an identity manager to attempt to prove that the user is entitled to access the web- or cloud-based application using the rich client. If the assertion can be verified, it is exchanged with a signed token, such as a token designed to protect against cross-site request forgery (CSRF). The rich client then accesses the web- or cloud-based application making a REST call that includes the signed token. The application, which recognizes the request as trustworthy, responds to the call with the requested data.

24 Claims, 5 Drawing Sheets

METHOD AND SYSTEM FOR AUTHENTICATING A RICH CLIENT TO A WEB OR CLOUD APPLICATION

BACKGROUND OF THE INVENTION

Technical Field

This disclosure relates generally to management of computing resources in a client-server environment and, in particular to techniques for authenticating non browser-based clients to web applications.

Background of the Related Art

User authentication to a web application from other than a browser-based client is desirable. In particular, it is known in the prior art to integrate Web- or cloud-based applications with so-called "rich" clients, where a "rich" client is a client (of a client-server application) that supports its own interface (as opposed to merely exporting the web interface from the web application itself). A "rich" client typically is not browser-based, and it is sometimes referred to as a "thick" (as compared to a browser-based or "thin") client. An illustrative rich client is Lotus Notes®, which provides email, calendaring, contact management, and instant messaging. Although a rich client can be used to access and automatically perform actions on behalf of a user, with existing technologies it is difficult to integrate a client-server application with a web application.

BRIEF SUMMARY

This disclosure describes a technique by which a rich client seamlessly integrates with and access a web- or cloud-based application. The rich client has an established manner of authenticating to its own native server, but it is assumed that there is no authentication mechanism by which the rich client can authenticate directly to the web- or cloud-based application. According to the described single sign on (SSO) approach, the rich client delegates to its native server the task of obtaining a credential, such as a SAML assertion. The native server, acting on behalf of the user, obtains an assertion from a federated identity provider (IdP) that is then returned to the rich client. The rich client then provides the assertion to a cloud-based proxy, which presents the assertion to an identity manager to attempt to prove that the user is entitled to access the web- or cloud-based application using the rich client. If the assertion can be verified, it is exchanged with a token, such as a token that has been signed to prevent cross-site request forgery (CSRF). The rich client then accesses the web- or cloud-based application using an XML-based protocol (e.g., REST) for exchanging structured data and type information on the Web. Preferably, the call includes the signed token, together with a session cookie. The application, which recognizes the request as trustworthy, responds to the call with the requested data.

In an alternative embodiment, the above-described discovery method is performed in an apparatus comprising a processor, and computer memory holding computer program instructions that when executed by the processor perform the method.

In another alternative embodiment, the above-described discovery method is performed by a computer program product in a computer readable medium for use in a data processing system. The computer program product holds computer program instructions which, when executed by the data processing system, perform the method.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
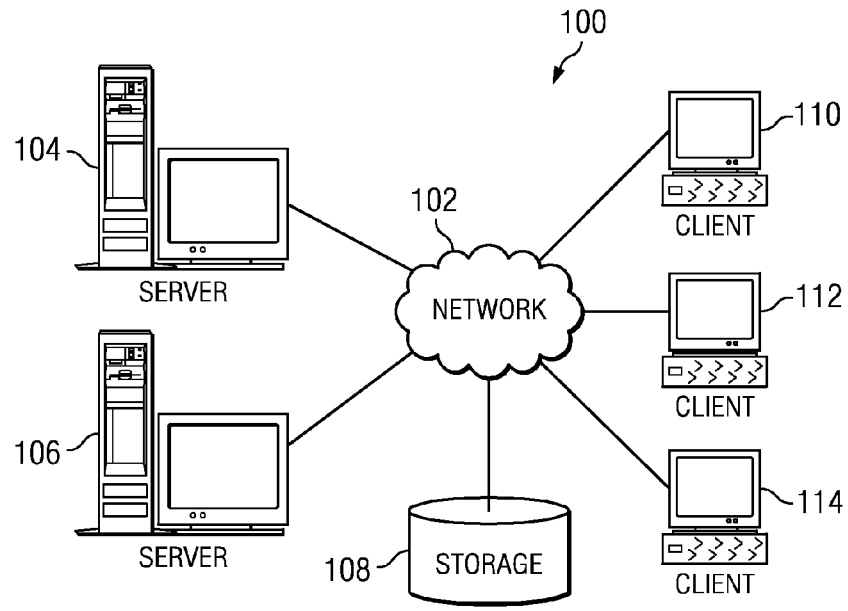
FIG. 1 depicts an exemplary block diagram of a distributed data processing environment in which exemplary aspects of the illustrative embodiments may be implemented.
Figure 2:
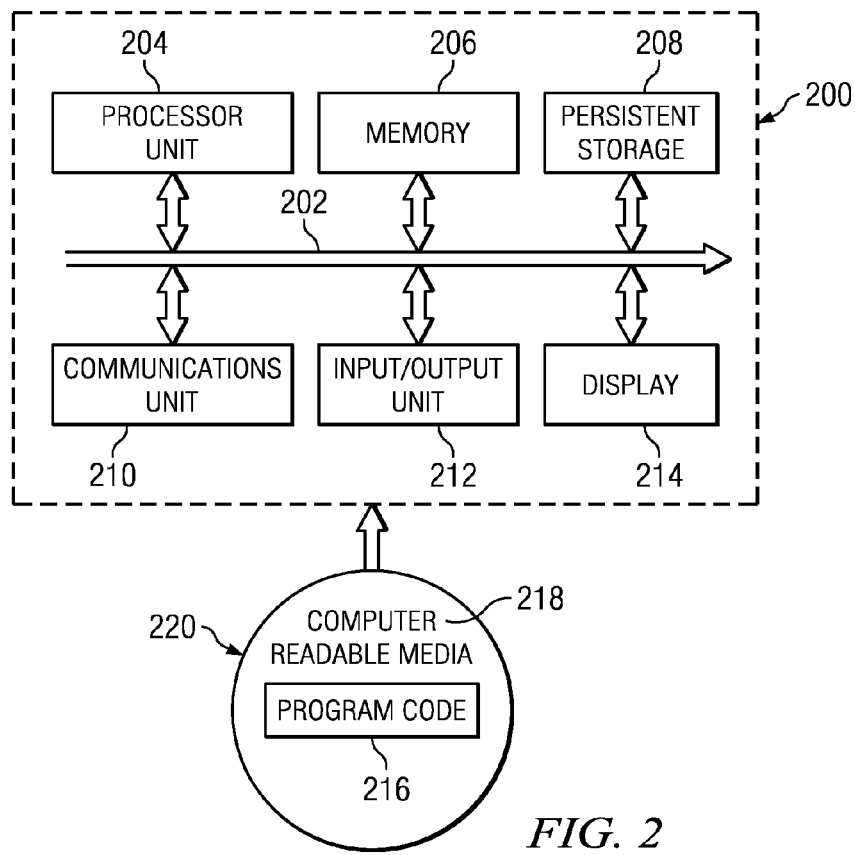
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

The Client-Server Model

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

By way of additional background, as used herein an "assertion" provides indirect evidence of some action. Assertions may provide indirect evidence of identity, authentication, attributes, authorization decisions, or other information and/or operations. An authentication assertion provides indirect evidence of authentication by an entity that is not the authentication service but that listened to the authentication service. As is known in the art, a Security Assertion Markup Language (SAML) assertion is an example of a possible assertion format that may be used with the present invention. SAML has been promulgated by the Organization for the Advancement of Structured Information Standards (OASIS), which is a non-profit, global consortium. SAML is described in "Assertions and Protocol for the OASIS Security Assertion Markup Language (SAML)", Committee Specification 01, May 31, 2002, as follows.

The Security Assertion Markup Language (SAML) is an XML-based framework for exchanging security information. This security information is expressed in the form of assertions about subjects, where a subject is an entity (either human or computer) that has an identity in some security domain. A typical example of a subject is a person, identified by his or her email address in a particular Internet DNS domain. Assertions can convey information about authentication acts performed by subjects, attributes of subjects, and authorization decisions about whether subjects are allowed to access certain resources. Assertions are represented as XML constructs and have a nested structure, whereby a single assertion might contain several different internal statements about authentication, authorization, and attributes. Note that assertions containing authentication statements merely describe acts of authentication that happened previously. Assertions are issued by SAML authorities, namely, authentication authorities, attribute authorities, and policy decision points. SAML defines a protocol by which clients can request assertions from SAML authorities and get a response from them. This protocol, consisting of XML-based request and response message formats, can be bound to many different underlying communications and transport protocols; SAML currently defines one binding, to SOAP over HTTP. SAML authorities can use various sources of information, such as external policy stores and assertions that were received as input in requests, in creating their responses. Thus, while clients always consume assertions, SAML authorities can be both producers and consumers of assertions.

The SAML specification states that an assertion is a package of information that supplies one or more statements made by an issuer. SAML allows issuers to make three different kinds of assertion statements: authentication, in which the specified subject was authenticated by a particular means at a particular time; authorization, in which a request to allow the specified subject to access the specified resource has been granted or denied; and attribute, in which the specified subject is associated with the supplied attributes.

Authentication is the process of validating a set of credentials that are provided by a user or on behalf of a user. Authentication is accomplished by verifying something that a user knows, something that a user has, or something that the user is, i.e. some physical characteristic about the user. Something that a user knows may include a shared secret, such as a user's password, or by verifying something that is known only to a particular user, such as a user's cryptographic key. Something that a user has may include a smartcard or hardware token. Some physical characteristic about the user might include a biometric input, such as a fingerprint or a retinal map. It should be noted that a user is typically, but not necessarily, a natural person; a user could be a machine, computing device, or other type of data processing system that uses a computational resource. It should also be noted that a user typically but not necessarily possesses a single unique identifier; in some scenarios, multiple unique identifiers may be associated with a single user.

An authentication credential is a set of challenge/response information that is used in various authentication protocols. For example, a username and password combination is the most familiar form of authentication credentials. Other forms of authentication credential may include various forms of challenge/response information, Public Key Infrastructure (PKI) certificates, smartcards, biometrics, and so forth. An authentication credential is differentiated from an authentication assertion: an authentication credential is presented by a user as part of an authentication protocol sequence with an authentication server or service, and an authentication assertion is a statement about the successful presentation and validation of a user's authentication credentials, subsequently transferred between entities when necessary.

Federated SSO

Figure 3:
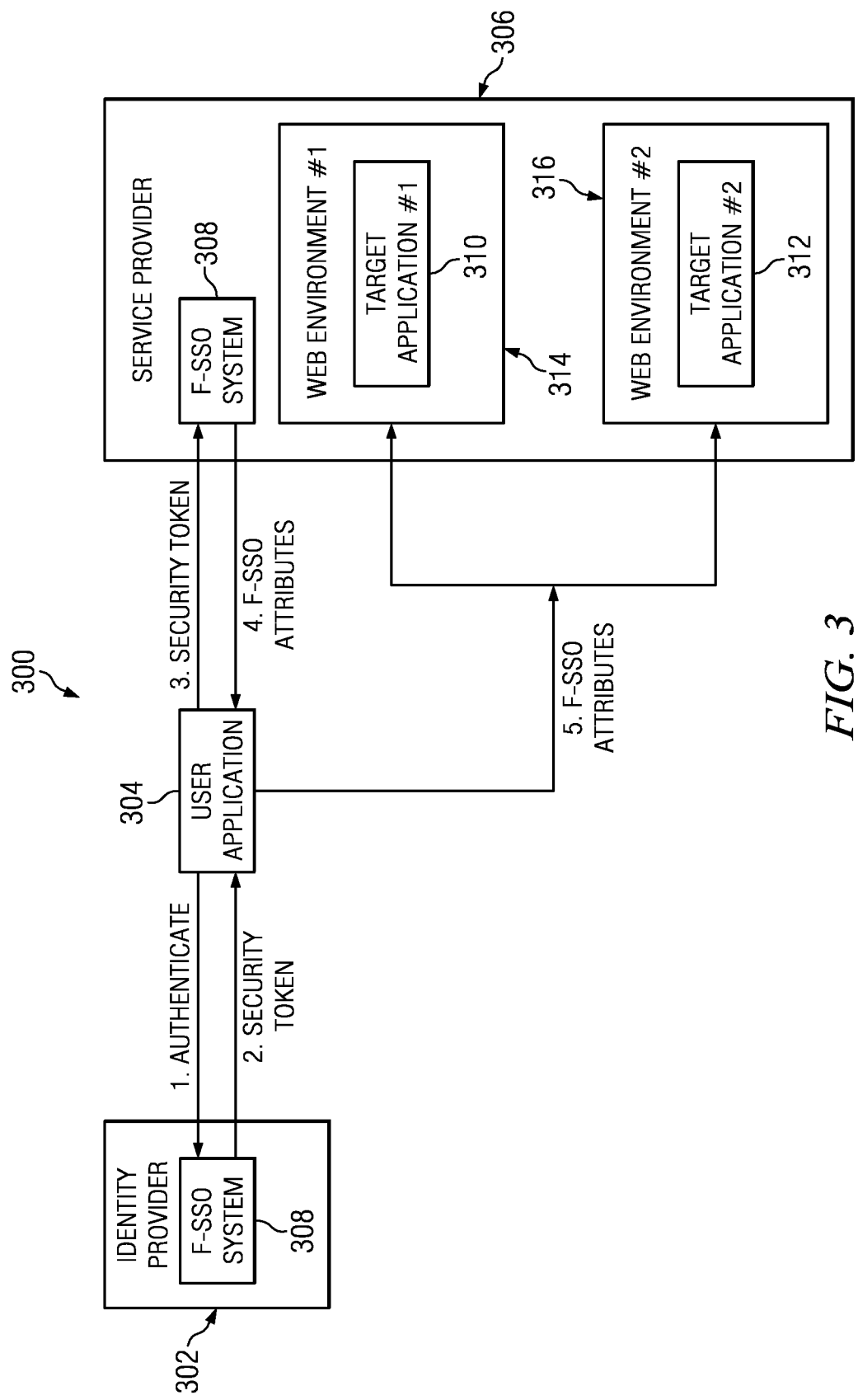
FIG. 3 illustrates a known federated single sign-on (F-SSO) operation.

Single sign-on (SSO) is an access control mechanism which enables a user to authenticate once (e.g., by providing a user name and password) and gain access to software resources across multiple systems. Typically, an SSO system enables user access to resources within an enterprise or an organization. Federated single sign-on (F-SSO) extends the concept of single sign-on across multiple enterprises, thus establishing partnerships among different organizations and enterprises. F-SSO systems typically include protocols, such as SAML, that allow one enterprise (e.g., an identity provider) to supply a user's identity and other attributes to another enterprise (e.g., a service provider). In other words, an F-SSO system helps transport the user's credentials from the identity provider to the service provider in a trusted manner using a suitable protocol, typically HTTP. FIG. 3 is a block diagram illustrating the typical flow of operations in a known federated single sign-on (F-SSO) process. As shown in FIG. 3, the F-SSO process 300 involves communications between an identity provider 302, a user application 304, and a service provider 306. The identity provider 302 and the service provider 304 include an F-SSO system 308, which includes logic to authenticate a user, establish the user's credentials, and generate an encrypted security token (e.g., cookie) including user information. Additionally, the service provider 306 can also include one or more target applications 310 and 312. The target applications can reside within the same web environment or be a part of different web environments 314 and 316 (e.g., Apache, WebSphere® etc.) within the same service provider 306. The user application 304 can include logic (e.g., a web browser) to present content (e.g., web pages) to the user.

In one embodiment, the user application 304 first authenticates to the identity provider 302 (e.g., providing a username and password) as indicated by step 1. In step 2, the identity provider's F-SSO system 308 returns a security token to the user. This security token may be time-sensitive (e.g., can include a time stamp) and cryptographically signed. The security token can include the user's identity (e.g., username) and other attributes (e.g., user identification number) that the identity provider 302 wishes to provide to the service provider 306. The user application 304 can present the security token to the service provider's F-SSO system using any suitable technique (e.g., HTTP request) and message structure (e.g., using HTTP query strings, HTTP POST data, etc.) defined by the F-SSO protocol (refer to step 3). In step 4, the service provider's F-SSO system 308 validates the cryptographic signature of the security token to confirm the token's authenticity of origin and that the contents of the security token are trustworthy. The service provider's F-SSO system can also extract the user's identity and related attributes from the security token and generate an F-SSO attributes cookie including the user's identity and attributes.

After achieving single sign-on (i.e., conveying user attributes from the identity provider's F-SSO system to the service provider's F-SSO system), if the user wants to access a target application (e.g., 310) hosted by the service provider 306, the user application 304 may pass an F-SSO attributes cookie obtained from the service provider's F-SSO system 308 to the target application (refer to step 5). In the alternative, attributes may be stored at a proxy and passed as a user's request passes through the proxy so that cookies are not required. In this example embodiment, the transfer of user attributes (e.g., in an F-SSO cookie) is done in a trustworthy and secure manner and can be performed on the basis of F-SSO prescribed protocols (typically HTTP). If the data contained within an F-SSO attributes cookie is accepted and understood by the target application (e.g., if the target application can decrypt and retrieve the cookie's contents), the target application (e.g., 310) validates it and creates a session for the user. In some embodiments, the target applications (e.g., 310) understand the F-SSO attributes cookie, or they can be part of the F-SSO process (i.e., the target application may not include an F-SSO system).

The Cloud Computing Model

By way of additional background, cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party, and it may be on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 4:
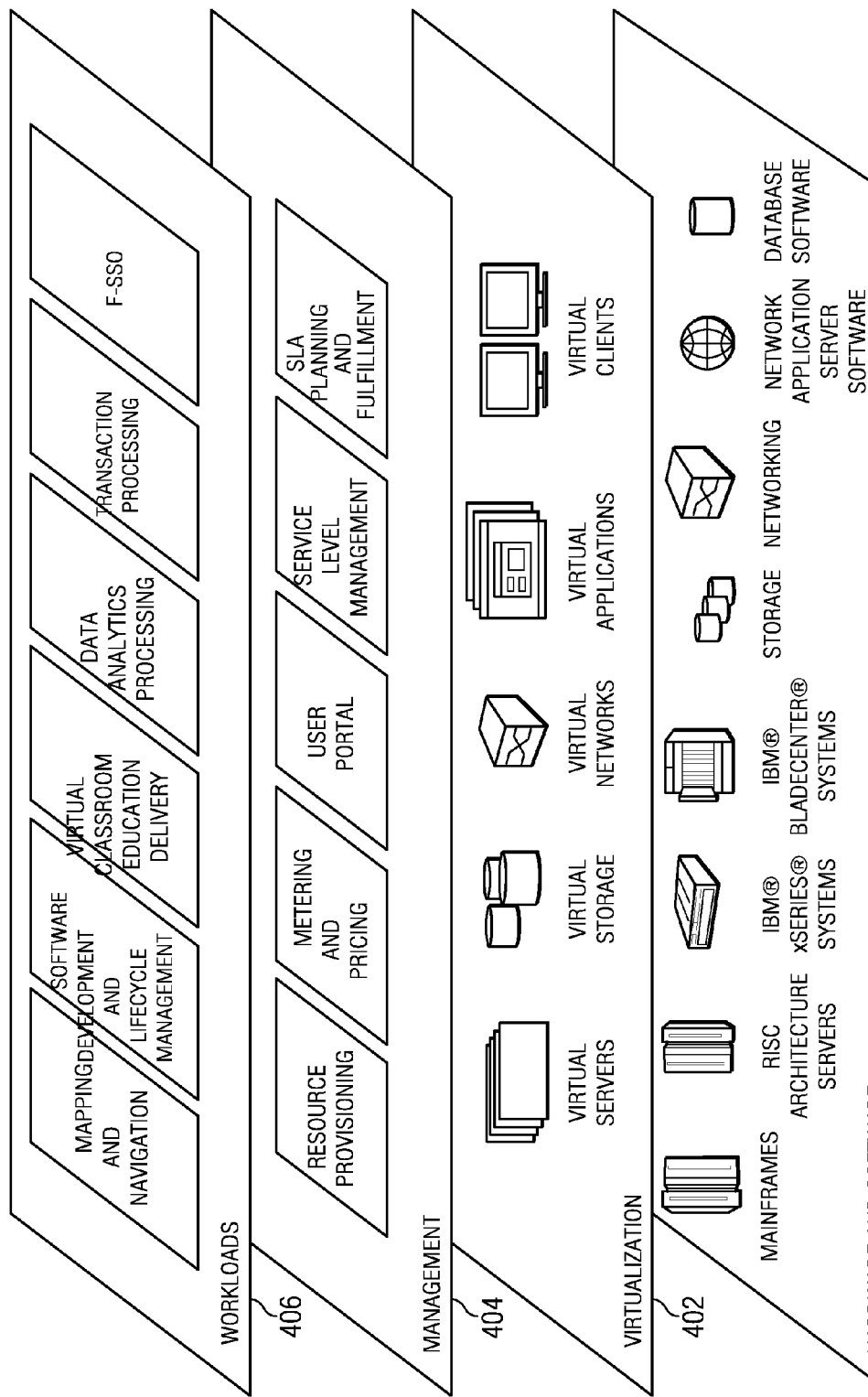
FIG. 4 depicts abstraction model layers of a cloud computing environment in which an identity provider discovery process may be implemented according to an embodiment of the invention.

Referring now to FIG. 4, by way of additional background, a set of functional abstraction layers provided by a cloud computing environment is shown. It should be understood in advance that the components, layers, and functions shown in FIG. 4 are intended to be illustrative only and embodiments of the invention are not limited thereto. As depicted, the following layers and corresponding functions are provided:

Hardware and software layer 400 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 402 provides an abstraction layer from which the following examples of virtual entities may be provided: virtual servers; virtual storage; virtual networks, including virtual private networks; virtual applications and operating systems; and virtual clients.

In one example, management layer 404 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 406 provides examples of functionality for which the cloud computing environment may be utilized. Examples of workloads and functions which may be provided from this layer include: mapping and navigation; software development and lifecycle management; virtual classroom education delivery; data analytics processing; transaction processing; and, according to the teachings of this disclosure, a cloud application to which a rich client desires to authenticate via the SSO technique described below.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide F-SSO to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute the target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud.

In a representative embodiment, the subject matter that is now described is implemented in a cloud-based client-server application, although this is not a limitation. One such client-server application is IBM® LotusLive, which provides a cloud-delivered suite of technologies that combine web conferencing, messaging, and collaboration services with social networking capabilities in an easy-to-use web-based environment. As a component of IBM® LotusLive, LotusLive Notes® provides a full-featured email, calendaring, contact management, and instant messaging. A user can access the service directly over the Internet in a number of ways, although the subject disclosure concerns access via a rich client, in this case, the Notes rich client. Using this service, an enterprise places its email, calendar and/or collaboration infrastructure in the cloud, and a user uses the Notes client to access his or her email, perform a calendar operation, or facilitate an online collaboration. In a representative embodiment, the Notes rich client is Version 8.5.2 or higher.

By way of additional background, cross-site request forgery (CSRF) is a known exploit of a website whereby unauthorized commands are transmitted from a user that the website trusts. It is desirable to protect against CSRF vulnerabilities during web- or cloud-based request-response processing.

REST (Representational State Transfer) is a lightweight XML-based protocol commonly used for exchanging structured data and type information on the Web. SOAP over HTTP may be used in lieu of REST for exchanging XML-based messages over the network.

Client-Server Application Integration with Web Application

With the above background, the subject matter of this disclosure describes a technique by which a rich client can seamlessly integrate with and access a web- or cloud-based application. It is assumed that the rich client has an established manner of authenticating to its own native server, but there is no authentication mechanism by which the rich client can authenticate directly to the web- or cloud-based application. According to the described approach, the rich client delegates to its native server the task of obtaining a credential, such as a SAML assertion. The native server, acting on behalf of the user, obtains an assertion from a federated identity provider (IdP) that is then returned to the rich client. The rich client provides the assertion to a proxy, which presents the assertion to an identity manager to attempt to prove that the user is entitled to access the web- or cloud-based application using the rich client. If the assertion can be verified, it is exchanged with a signed token, such as a cross-site request forgery (CSRF) token. The CSRF token provides a guarantee that the communication to which it is attached is not some unauthorized command transmitted from a user that the website otherwise trusts. The rich client then accesses the web- or cloud-based application making a REST call that includes the signed token, together with a session cookie. If the token can be validated by the application, the requested data is returned in response to the REST call. In this manner, the technique provides single sign-on (SSO) from the rich client to the web- or cloud-based application in a simple and reliable manner using existing services, namely, federated identity management, re-purposed as described.

Figure 5:
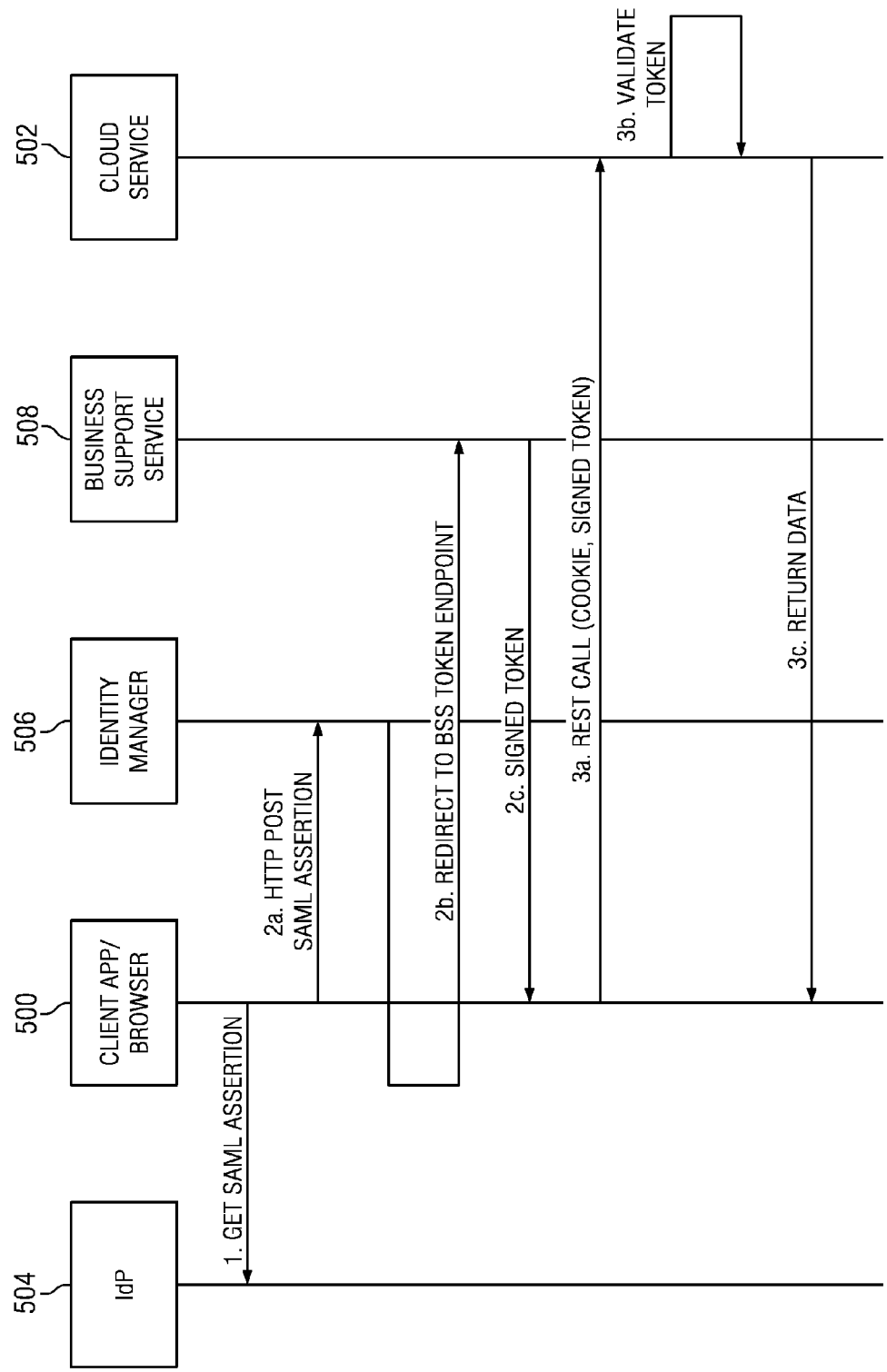
FIG. 5 illustrates a technique that provides single sign-on (SSO) from a rich client to the web- or cloud-based application according to this disclosure.

FIG. 5 illustrates the technique in a simplified process flow diagram. In this example, the rich client 500 desires to access application 502 hosted in the cloud. The rich client 500 has an established way of authenticating to its own native server (not shown), but (in this scenario) it is assumed that the client 500 cannot authenticate directly to the application 502. To enable such authentication, at step (1), the rich client 500 obtains a SAML assertion from the identity provider 504. Step (1) preferably is carried out indirectly, namely, by the rich client's native server, which obtains the credential on the rich client's behalf. Thus, according to this technique, the rich client has delegated to its native server the task of obtaining the assertion. At step (2a), the rich client issues an HTTP POST to a federated identity manager 506, such as TFIM, which verifies the assertion and, at step (2b), issues a redirect that the rich client then follows to a target endpoint 508, such as a BSS endpoint, which provides an identity management service on behalf of the application 502. At step (2c), the BSS endpoint returns the signed token back to the rich client. At step (3a), the rich client makes a REST call to the application 502 passing the signed token and, optionally, a cookie. At step (3b), the application validates the token. If the token is validated, the application 502 responds to the REST call in step (3c) by returning the requested data. This completes the process.

Preferably, the signed token is based on a subscriber ID and is set to expire after a given time period, such as one (1) hour. When the token expires, the rich client repeats steps (1-2) to retrieve a new token.

Figure 6:
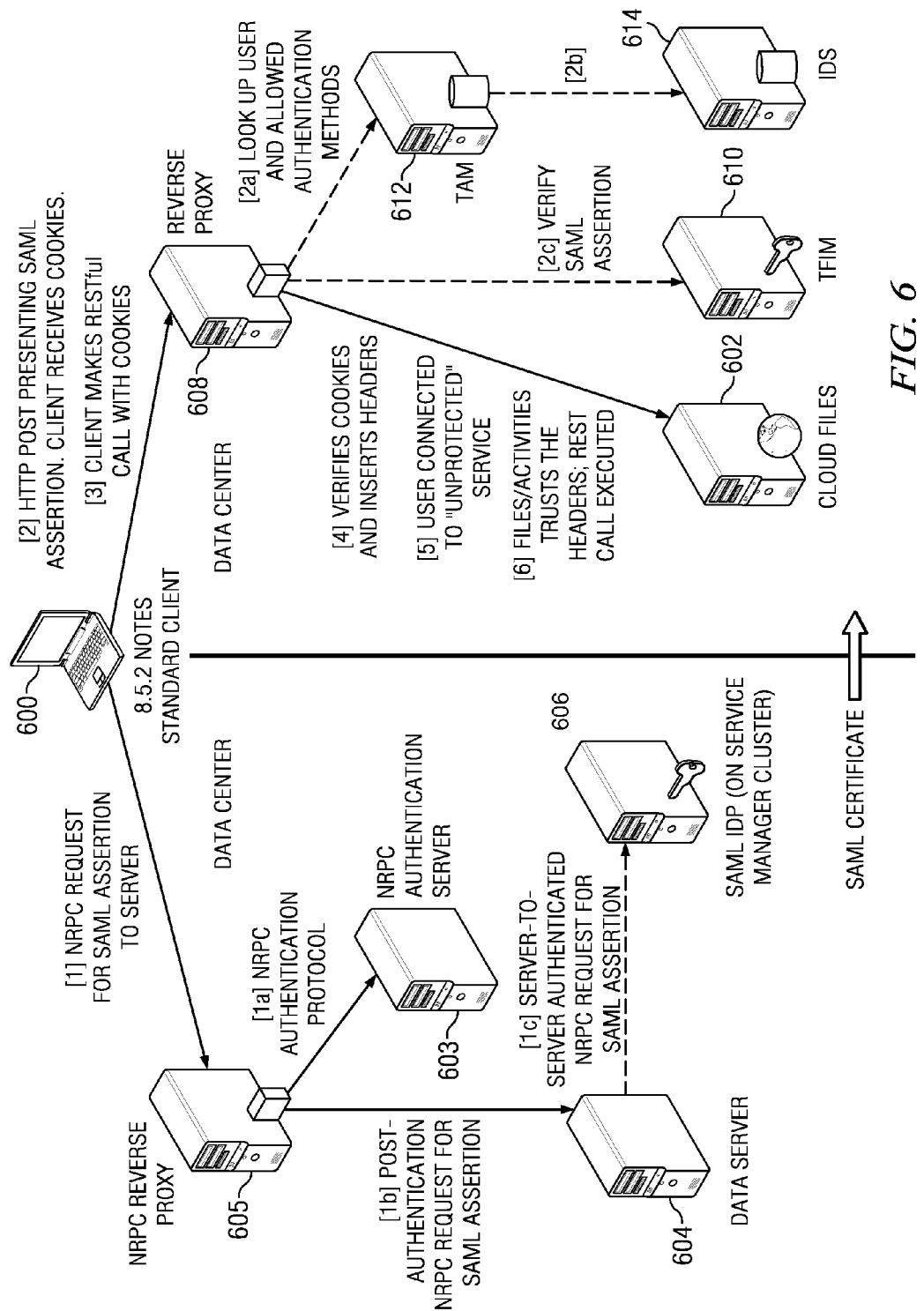
FIG. 6 illustrates a preferred embodiment of the SSO technique for a particular cloud-based service, namely, IBM® LotusLive.

FIG. 6 illustrates a detailed implementation according to a preferred embodiment. In this embodiment, some components are located in a first data center (on the left-side portion of the drawing), and the cloud-based components are located in a second data center (on the right-side portion of the drawing). As described above, in this scenario rich client 600 seeks access to a file from a cloud-based web application server 602 hosted in the cloud. For purposes of illustration only, rich client 600 is a LotusLive Version 8.5.2 Notes e-mail client, and the web application server 602 is LotusLive server. The rich client 600 has an associated native application server, in this case Domino® data server 604, with which it has an established authentication mechanism (that uses authentication server (NRPC) identified by reference numeral 603). In this implementation, an identity provider 606 is associated with the native application server. The identity provider understands and implements a federated identity mechanism that can provide assertions (e.g., a SAML assertion) and publish trust certificates, all in a known manner. The rich client interfaces to the authentication server 603 and the native application server 604 via a reverse proxy 605. NRPC authentication server 603 and reverse proxy 605 may be a single entity, which entity may also include the native server 604 (as an identity federation). The cloud comprises a proxy 608, which provides a front end to both the application server 602, and a group of identity management elements comprising an identity manager server (TFIM) 610, which understands SAML), an access manager (TAM) 612, which provides access control, and a directory server (IDS) 614. Elements 610, 612 and 614 may be integrated, and the proxy may execute on the same machine (or machines) on which the application server 602 executes.

Of course, the illustrated client-server application is merely representative, as are the various support components. They should be taken to limit the scope of this subject matter.

At step (1), the rich client 600 makes a request to its native server. The request conforms to the client-server protocol and seeks an assertion. Thus, if the rich client is a LotusLive Version 8.5.2 Notes client, the request is an NRPC request for a SAML assertion. A NRPC service (not shown) may be used to locate the authentication server 603. NRPC service uses a combination of the Notes Name Service and DNS to resolve server names to network addresses. The request is received an NRPC reverse proxy server 605. At step (1a), the reverse proxy 605 passes the request to the authentication server 603, which authenticates the rich client in the usual manner. At step (1b), the proxy 605 passes the NRPC request for the SAML assertion to the native application server 604. The native application server 604 has been delegated the task (on the user's behalf) of obtaining a federated identity. To this end, at step (1c), the native application server 604 communicates to the identity provider 606, making a server-to-server authenticated NRPC request for the SAML assertion. The identity provider 606 responds with the SAML assertion, which assertion is then returned to the rich client 600 by way of the proxy 605. Although SAML is described, one of ordinary skill in the art will recognize that other services and protocols may be used, such as Liberty, Shibboleth, OpenID, and the like.

The rich client can then obtain the desired files from the cloud using the assertion that its native application server has just obtained on its behalf. In particular, at step (2), the rich client performs an HTTP POST, presenting the SAML assertion. The HTTP POST occurs automatically (i.e., without user action) upon return of the response to the NRPC request in step (1). Step (2) typically involves several sub-steps. At step (2a), the proxy 608 performs a look-up to the access manager server 612 to determine whether the user is authorized to access the service, as well as the allowed authentication methods. The access manager, in response, performs step (2b) by querying the directory server 614 for the user and access control information. The proxy 608 also verifies the SAML assertion by querying the identity manager 610 at step (2c). Step (2c) verifies whether the credential presented by the rich client has been issued by a recognized identity provider (in this case, identity provider 606, as evidenced by the certificate). If, as a result of step (2), the credential has been verified and the access request is permitted, the proxy 608 returns to the rich client a session cookie, in this embodiment a WebSEAL cookie provided by TAM 612. At step (3), and using the session cookie, the rich client then requests a CSRF token, e.g., by issuing a GET request to a token generating method located at a given domain. Upon receipt of the signed token, the rich client then makes a RESTful call to the application server 602, passing both the signed token and the session cookie. At step (4), the proxy 608, which understands the session cookie, verifies the WebSEAL cookie and inserts access manager (e.g., TAM) headers into the request. At step (5), the user is connected to the service and, in particular, the application server 602. At step (6), and because the service trusts the TAM headers, the REST call is executed and the requested data returned to the rich client. This completes the process.

Thus, FIG. 6 illustrates the use of SAML with a browser/POST from the LotusLive Notes v2 to BSS, and the WebSEAL cookies from BSS to LotusLive RESTful services. In this example, WebSEAL cookies are returned once the SAML assertion is verified and are used to authenticate the user on subsequent calls. CSRF protection is provided by way of a non-cookie header returned from the RESTful service to the client and included in future queries.

The functionality described above may be implemented as a standalone approach, e.g., a software-based function executed by a processor, or it may be available as a managed service (including as a web service via a REST or SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, SAML, Liberty, Shibboleth, OpenID, WS-Federation, Cardspace, WS-Trust, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures other than cloud-based infrastructures. These include, without limitation, simple n-tier architectures, web portals, federated systems, and the like.

As the above examples illustrate, one or more of the described functions may be hosted within or external to the cloud.

Still more generally, the subject matter described herein can take the form of an entirely hardware embodiment, an entirely software embodiment or an embodiment containing both hardware and software elements. In a preferred embodiment, the layered logout function is implemented in software, which includes but is not limited to firmware, resident software, microcode, and the like. The data can be configured into a data structure (e.g., an array, a linked list, etc.) and stored in a data store, such as computer memory. Furthermore, as noted above, the identity provider instance discovery functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the identity provider instance discovery components are implemented in a special purpose computer, preferably in software executed by one or more processors. The associated configuration (security levels, status, timers) is stored in an associated data store. The software also is maintained in one or more data stores or memories associated with the one or more processors, and the software may be implemented as one or more computer programs.

The SSO function described herein may be implemented as an adjunct or extension to an existing identity provider, access manager or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Any application or functionality described herein may be implemented as native code, by providing hooks into another application, by facilitating use of the mechanism as a plug-in, by linking to the mechanism, and the like.

Having described our invention, what we now claim is as follows:

1. A method of enabling a rich client to authenticate to and access a web- or cloud-based application, comprising:
in response to an authentication request issued by the rich client, the rich client being other than browser-based and that supports its own interface as opposed to exporting a web interface to the web- or cloud-based application, obtaining an assertion on behalf of the rich client from an identity provider;
in response to receiving the assertion, determining whether the assertion can be verified and whether a user associated with the assertion is permitted to access the application using the rich client;
when the assertion can be verified and the user associated with the assertion is permitted to access the application using the rich client, exchanging the assertion for a token;
receiving a call together with the token; and
when the token is validated, providing data in response to the call.

2. The method as described in claim 1 wherein the assertion is obtained by an application server associated with the rich client.

3. The method as described in claim 1 wherein the identity provider is a federated identity provider.

4. The method as described in claim 1 wherein the step of determining whether the user associated with the assertion is permitted to access the application using the rich client includes returning a session cookie if the outcome of the determination is positive.

5. The method as described in claim 4 wherein the call also includes the session cookie.

6. The method as described in claim 1 wherein the call is a REST call.

7. The method as described in claim 1 wherein the assertion is received via an HTTP POST generated in response to the authentication request.

8. The method as described in claim 1 wherein the rich client provides at least one of: email, calendaring, contact management, and instant messaging.

9. Apparatus to enable a rich client to authenticate to and access a web- or cloud-based application, comprising:
a processor;
computer memory holding computer program instructions executed by the processor to perform operations comprising:
in response to an authentication request issued by the rich client, the rich client being other than browser-based and that supports its own interface as opposed to exporting a web interface to the web- or cloud-based application, obtaining an assertion on behalf of the rich client from an identity provider;
in response to receiving the assertion, determining whether the assertion can be verified and whether a user associated with the assertion is permitted to access the application using the rich client;
when the assertion can be verified and the user associated with the assertion is permitted to access the application using the rich client, exchanging the assertion for a token;
receiving a call together with the token; and
when the token is validated, providing data in response to the call.

10. The apparatus as described in claim 9 wherein the assertion is obtained by an application server associated with the rich client.

11. The apparatus as described in claim 9 wherein the identity provider is a federated identity provider.

12. The apparatus as described in claim 9 wherein determining whether the user associated with the assertion is permitted to access the application using the rich client includes returning a session cookie if the outcome of the determination is positive.

13. The apparatus as described in claim 12 wherein the call also includes the session cookie.

14. The apparatus as described in claim 9 wherein the call is a REST call.

15. The apparatus as described in claim 9 wherein the assertion is received via an HTTP POST generated in response to the authentication request.

16. The apparatus as described in claim 9 wherein the rich client provides at least one of: email, calendaring, contact management, and instant messaging.

17. A computer program product in a non-transitory computer readable medium for use in a data processing system to enable a rich client to authenticate to and access a web- or cloud-based application, the computer program product holding computer program instructions which, when executed by the data processing system, perform a method comprising:

in response to an authentication request issued by the rich client, the rich client being other than browser-based and that supports its own interface as opposed to exporting a web interface to the web- or cloud-based application, obtaining an assertion on behalf of the rich client from an identity provider;

in response to receiving the assertion, determining whether the assertion can be verified and whether a user associated with the assertion is permitted to access the application using the rich client;

when the assertion can be verified and the user associated with the assertion is permitted to access the application using the rich client, exchanging the assertion for a token;

receiving a call together with the token; and when the token is validated, providing data in response to the call.

18. The computer program product as described in claim 17 wherein the assertion is obtained by an application server associated with the rich client.

19. The computer program product as described in claim 17 wherein the identity provider is a federated identity provider.

20. The computer program product as described in claim 17 wherein the step of determining whether the user associated with the assertion is permitted to access the application using the rich client includes returning a session cookie if the outcome of the determination is positive.

21. The computer program product as described in claim 20 wherein the call also includes the session cookie.

22. The computer program product as described in claim 17 wherein the call is a REST call.

23. The computer program product as described in claim 17 wherein the assertion is received via an HTTP POST generated in response to the authentication request.

24. The computer program product as described in claim 17 wherein the rich client provides at least one of: email, calendaring, contact management, and instant messaging.

* * * * *